(12) United States Patent
Morein et al.

(10) Patent No.: US 6,483,505 B1
(45) Date of Patent: Nov. 19, 2002

(54) METHOD AND APPARATUS FOR MULTIPASS PIXEL PROCESSING

(75) Inventors: Stephen L. Morein, Cambridge, MA (US); Mark C. Fowler, Hopkinton, MA (US); Andrew E. Gruber, Arlington, MA (US)

(73) Assignee: ATI International SRL, Barbados (BB)

( * ) Notice: Subject to any disclaimer, the term of this patent is extended or adjusted under 35 U.S.C. 154(b) by 0 days.

(21) Appl. No.: 09/527,752

(22) Filed: Mar. 17, 2000

(51) Int. Cl.[7] .............................................. G06T 15/00
(52) U.S. Cl. ..................................................... 345/419
(58) Field of Search ................................ 345/419, 422, 345/503, 619, 621, 625, 628

(56) References Cited

U.S. PATENT DOCUMENTS

| | | | | |
|---|---|---|---|---|
| 5,867,166 A | * | 2/1999 | Myhrvold et al. | 345/419 |
| 6,191,788 B1 | * | 2/2001 | Fuller | 345/419 |
| 6,339,424 B1 | * | 1/2002 | Ishikawa et al. | 345/419 |
| 6,342,892 B1 | * | 1/2002 | Van Hook et al. | 345/503 |

OTHER PUBLICATIONS

The 1996 Silicon Valley Personal Computer Design Conference, Oct. 7/9, 1996.
Pyramid3D TR25202 Hardware Reference Manual Rev. 2.11, 1997.

* cited by examiner

*Primary Examiner*—Phu K. Nguyen
(74) *Attorney, Agent, or Firm*—Vedder, Price, Kaufman & Kammholz (57) ABSTRACT

A method and apparatus for multipass pixel processing is presented. A command stream that includes a plurality of drawing commands is received where multipass drawing commands included in the stream include a number of sets of state information and one or more graphics primitives. For a multipass pixel processing operation, the graphics pipeline that performs the pixel processing is first configured using a first set of state information included in the sets of state information for the multipass operation. Once the graphics pipeline has been configured, at least a portion of the processing to be performed for the drawing command is performed using the graphics pipeline as configured by this first set of state information. The resultant data produced through this processing is stored as intermediate data. This may be referred to as the first pass in the multipass operation. The graphics pipeline is then reconfigured using a subsequent set of state information corresponding to the multipass drawing command. Once the graphics pipeline has been reconfigured, the second pass takes place. The second pass includes processing the portion of the graphics data processed during the first pass using the graphics pipeline as configured by the subsequent set of state information. Such processing includes utilization of the intermediate data such that the results of the first pass are included in the processing operations of the second pass.

24 Claims, 3 Drawing Sheets

METHOD AND APPARATUS FOR MULTIPASS PIXEL PROCESSING

FIELD OF THE INVENTION

The invention relates generally to graphics processing in a computer system and more particularly to a method and apparatus for multipass pixel processing.

BACKGROUND OF THE INVENTION

Graphics processing operations in computer systems are becoming increasingly complex. Some applications such as computer games require complex graphical images to be generated and displayed. In order to enable these complex, highly-detailed images to be generated and displayed in an efficient manner, numerous operations that add and modify colors associated with the images are performed in order to enhance the resulting display.

Computer displays and other high resolution display devices such as high definition televisions (HDTV), projectors, printers, plotters, and the like, present an image to the viewer as an array of individual picture elements, or pixels. The individual pixels are each given a specific color, which corresponds to the color of the image at the location of the particular pixel. The pixels are closely spaced, and the viewers visual system performs a filtering of the individual pixel colors to form a composite image. If the partitioning of the image into individual pixel elements is performed properly, and the pixels are close enough together, the viewer perceives the displayed array of pixels as a virtually continuous image.

One technique often used to modify and enhance the colors associated with various pixels on the display is texture mapping. In order to display some screen images, detailed textures are stored in memory. These textures are then molded and adapted to overlay or map to structures for display. An example is a brick pattern that is mapped to a wall structure, where if the wall is extending into the distance, the texture will be mapped in such a way as to show perspective.

In many cases these textures are modified or combined in order to further enhance their utility. An example would be the blending the input of two separate textures to effectively form a composite texture. Another example includes modifying the lighting of the texture so as to simulate light coming from a singular source or from multiple sources. In some cases, a single texture may be modified by a number of operations in order to generate a new texture for use.

In some instances it may be desirable to modify a single object, which is made up of one or more video graphics primitives, using multiple textures and/or functions that affect the final color value for each of the pixels corresponding to the object. In prior art systems, a limited set of instructions would often be provided that would enable a fixed array of operators to act on a particular set of pixels as it passed through the graphics pipeline. A further limitation is realized in that the pipeline may have hardware limitations that restrict the number of textures that can be used in the processing of a graphics primitive. For example, the pipeline may only include the circuitry to allow four textures to be used in modifying the data for each primitive as it passes through the pipeline. In such a limited system, no operations using five or more textures could be performed.

Thus, although such prior art systems were capable of allowing a pixel to be modified by a limited number of textures, the variety of operations was confined both by the hardware used to implement the graphics pipeline and the set of instructions provided for utilizing that hardware. These limitations are undesirable in video graphic systems that may require very complex operations to be performed in order to determine the appropriate color for a particular pixel. Although adding additional circuitry to the graphics pipeline and more instructions to the set of instructions supported alleviates some of these limitations, the overall functionality is still limited by the hardware and instructions. Additionally, the cost associated with adding such additional hardware and instruction support is undesirable.

Therefore, a need exists for a method and apparatus for pixel processing that enables complex and configurable pixel processing operations to be performed in a highly-flexible manner utilizing a limited amount of circuitry included in the graphics pipeline.

DETAILED DESCRIPTION OF A PREFERRED EMBODIMENT OF THE INVENTION

Generally, the present invention provides a method and apparatus for multipass pixel processing. A command stream that includes a plurality of drawing commands is received where multipass drawing commands included in the stream include a number of sets of state information and one or more graphics primitives. For a multipass pixel processing operation, the graphics pipeline that performs the pixel processing is first configured using a first set of state information included in the sets of state information for the multipass operation. Once the graphics pipeline has been configured, at least a portion of the processing to be performed for the drawing command is performed using the graphics pipeline as configured by this first set of state information. The resultant data produced through this processing is stored as intermediate data. This may be referred to as the first pass in the multipass operation. The graphics pipeline is then reconfigured using a subsequent set of state information corresponding to the multipass drawing command. Once the graphics pipeline has been reconfigured, the second pass takes place. The second pass includes processing the portion of the graphics data processed during the first pass using the graphics pipeline as configured by the subsequent set of state information. Such processing includes utilization of the intermediate data such that the results of the first pass are included in the processing operations of the second pass.

By enabling the circuitry within the graphics pipeline to perform multipass operations, the variety of operations that may be performed is not limited to a by finite set of instructions. This is because the state information that configures the graphics pipeline can be specifically configured for each individual operation such that data is routed through the graphics pipeline in a manner that enables multipass operations to occur. The feedback path provided from the output of the graphics pipeline to various points of input to the graphics pipeline enable the results from previous passes to be utilized in subsequent passes such that complex graphics processing operations can be performed using the limited circuitry provided.

Figure 1:
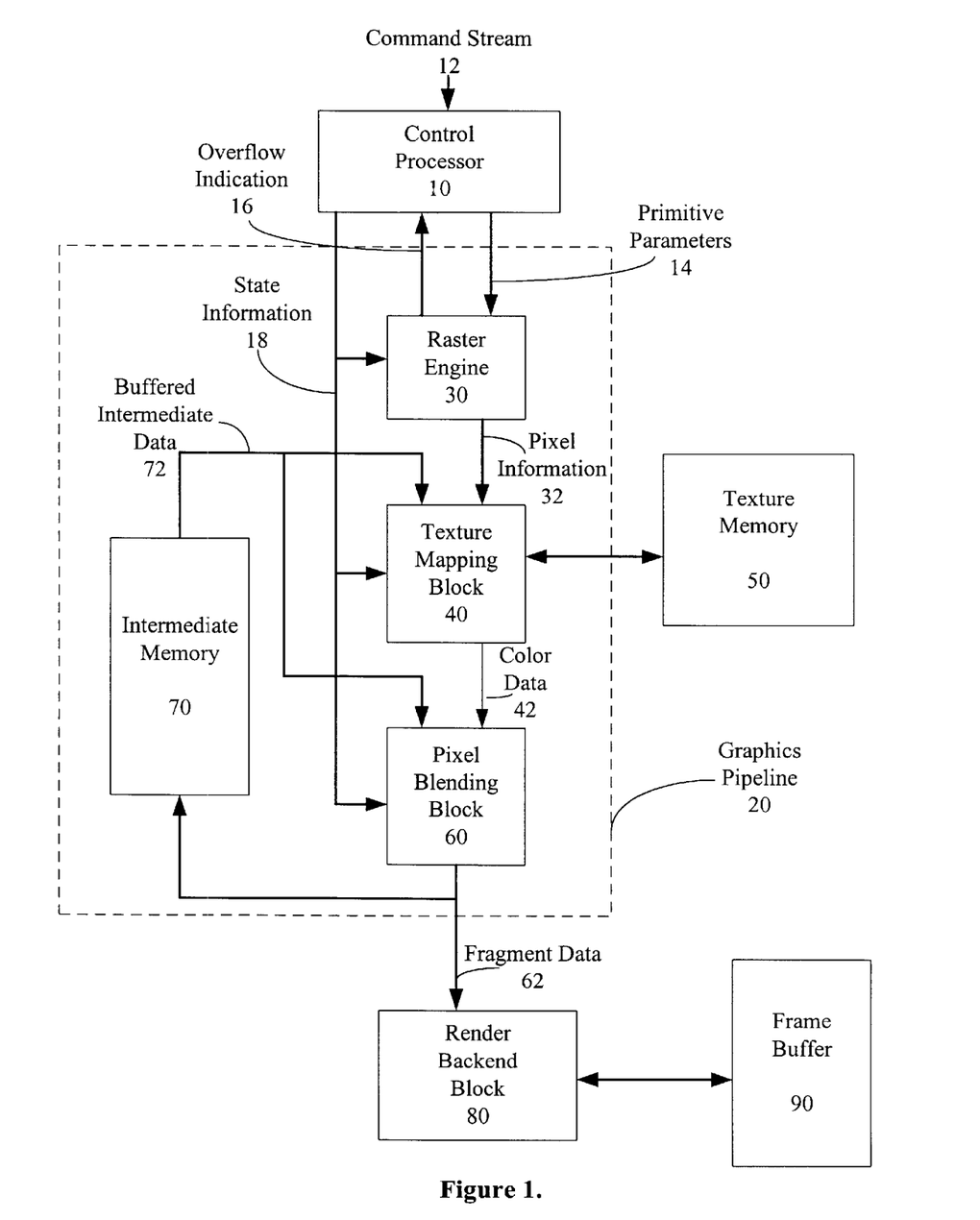
FIG. 1 illustrates a block diagram of a graphics processing circuit in accordance with a particular embodiment of the present invention.
Figure 2:
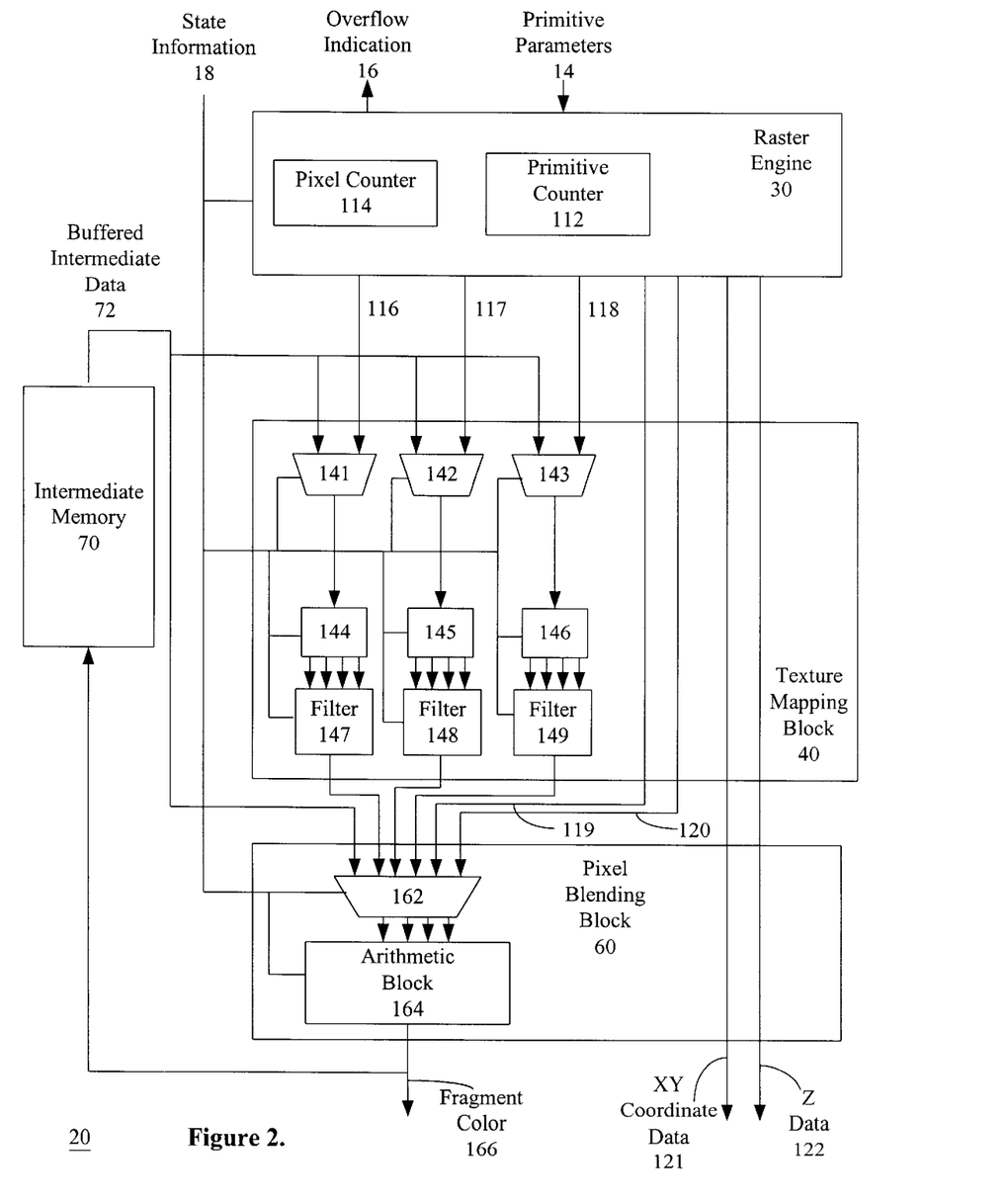
FIG. 2 illustrates a block diagram of the graphics pipeline portion of the graphics circuit illustrated in FIG. 1 in additional detail.
Figure 3:
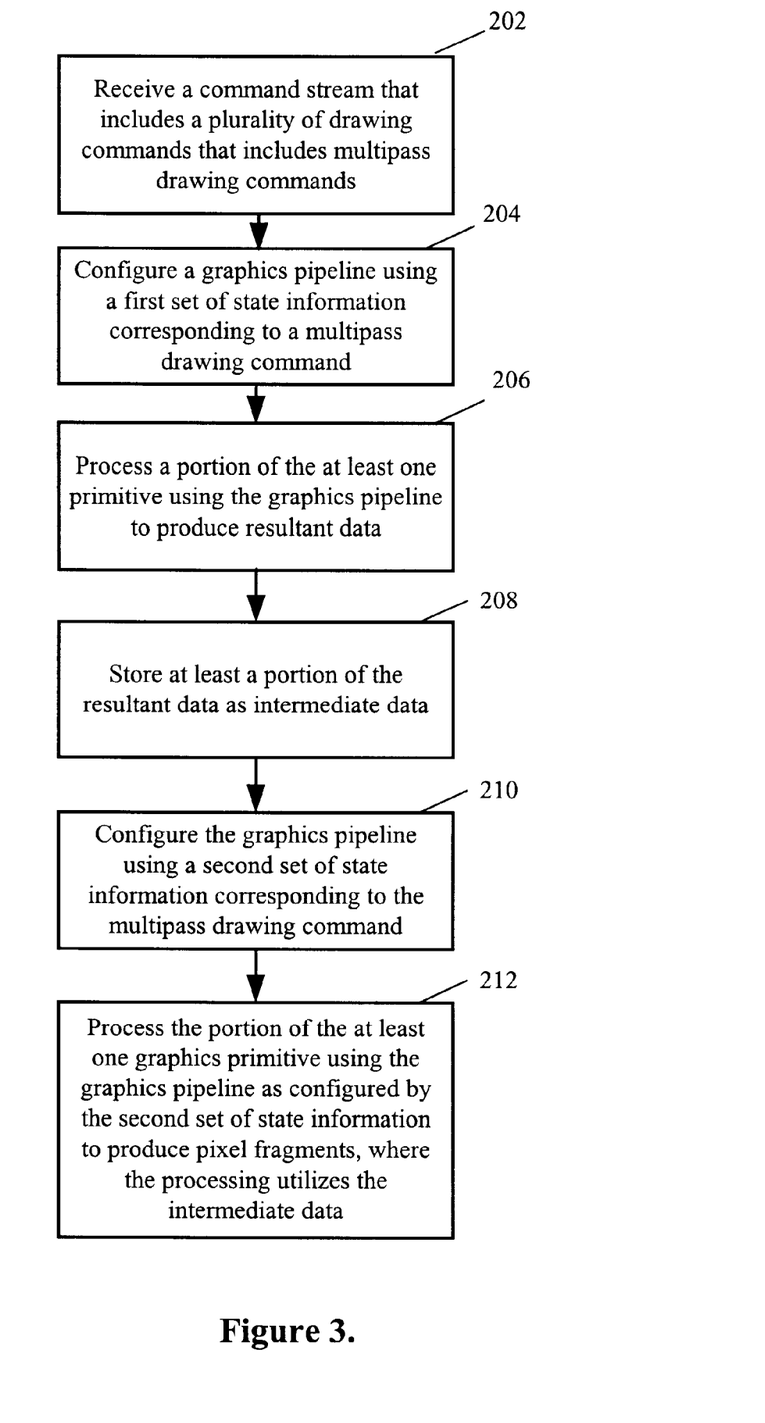
FIG. 3 illustrates a flow diagram of a method for multipass pixel processing in accordance with a particular embodiment of the present invention.

The invention can be better understood with reference to FIGS. 1–3. FIG. 1 illustrates a block diagram of a graphics processing circuit 100. The graphics processing circuit 100 includes a control processor 10, a graphics pipeline 20, a render backend block 80, and a frame buffer 90. The control processor 10 receives a command stream 12 that includes a plurality of drawing commands. Some of the drawing commands included in the command stream 12 may be multipass drawing commands that require complex processing by the graphics pipeline 20. Such multipass drawing commands include a plurality of sets of state information and at least one graphics primitive. A drawing command may relate to an object to be drawn, where the object is made up of a plurality of graphics primitives. For example, if a square is to be drawn, this may be accomplished by drawing two triangular graphics primitives. Both of these primitives could be included in the same drawing command as the texturing operations (and therefore the state information) associated with the two primitives would be the same.

The control processor 10 generates primitive parameters 14 based on the graphics primitives received in the command stream for a particular drawing command. In addition to generating the primitive parameters 14, the control processor 10 generates state information 18 that configures the graphics pipeline 20 to permit the performance of the desired graphics processing as indicated by the particular drawing command. The primitive parameters correspond to the graphics primitives that may be triangle primitives that are commonly used in graphics processing systems. The primitive parameters may include vertex information corresponding to graphics primitives where the vertex information may include various parameters such as coordinate data, color, texture map coordinates, etc.

In the case where a multipass operation is to be performed on a particular set of primitives, the control processor 10 will manage the multipass operation. Management of the multipass operations includes configuring the state information 18 as is appropriate for each pass and providing the set of primitives to the graphics pipeline 20 via the primitive parameters 14 for each pass of the multipass operation. For example, if a single triangle is to be processed using a multipass operation, the control processor 10 will send down a first set of state information 18 that configures the graphics pipeline 20 for a first pass. Along with this first set of state information, the primitive parameters 14 corresponding to the triangle will be provided to the graphics pipeline 20. Upon completion of the first pass, the control processor 10 reconfigures the state information 18 to correspond to the desired settings for the second pass. The same primitive parameters 14 are then provided to the graphics pipeline 20 to correspond to the triangle being processed. The state information 18 corresponding to the second pass may include information such that some of the results from the first pass are used in performing the calculations or blending operations that may take place during the second pass. The use of this "intermediate data" is described in additional detail below.

The graphics pipeline 20 is shown to include a raster engine 30, a texture mapping block 40, a pixel blending block 60, and an intermediate memory 70. The raster engine 30 is operably coupled to the control processor 10. A transform clip and light (TCL) setup block may also be included in the graphics circuit 100. In one embodiment, the TCL block may be positioned between the control processor 10 and the raster engine 30, whereas in other embodiments, the functions of the TCL setup block may be incorporated into the software routines included in the host central processor that generates the data provided to the control processor 10. In yet other embodiments, the TCL setup block may be implemented in hardware upstream from the control processor 10 such that it modifies the portions of the command stream 12 prior to the command stream being provided to the control processor 10. When located downstream from the control processor 10, the TCL setup block may perform some transformation operations on the primitive parameters 14 (vertex information) before they are passed on to the raster engine 30. In such embodiments, the TCL setup block may determine or modify the colors at the vertices for each of the primitives received from the control processor 10. This may include performing clipping operations that limit the portions of primitives which are processed as well as calculating lighting effects (specular, diffuse, or environmental mapped) that may modify color values associated with the primitives.

When the TCL setup block is included between the control processor 10 and the raster engine 30, the TCL setup block must be capable of generating all of the data required by the raster engine 30. This includes the generation of data corresponding to multiple passes. In order to facilitate the provision of the required data to the raster engine 30, the TCL setup block may generate the data for all passes and store it in a buffer that may be included as part of an integrated circuit that includes the raster engine 30 or that may be located "off-chip" in a discrete memory structure.

The raster engine 30 takes the information provided directly from the control processor 10 or from a TCL setup block and generates pixel information 32 on a pixel-by-pixel basis. The pixel information 32 may include sets of texture coordinates that map to specific textures, color values such as material color and specular color (related to lighting effects), and may also include the coordinates for the pixel including X and Y coordinates as well as Z (depth in three dimensional graphics processing) values. Additional detail as to the raster engine 30 and other portions of the graphics pipeline 20 are described with respect to FIG. 2 below. The operations performed by the raster engine 30 may be controlled at least partially based on state information 18 received from the control processor.

The texture mapping block 40 is operably coupled to the raster engine 30 and also is coupled to receive at least a portion of the state information 18. The texture mapping block 40 may also be operably coupled to receive buffered intermediate data 72 resulting from previous graphics processing operations (previous passes) performed by the graphics pipeline 20. The texture mapping block 40 generates at least one lookup value based on the pixel information 32 received from the raster engine 30. The lookup value may be generated based on texture maps stored in the texture memory 50 or based on various functions that are implemented through the use of lookup tables. Thus, in order to perform more complex mathematical operations that are normally beyond the scope of the circuitry included in the graphics pipeline 20, a lookup table may be used to approximate such complex functions. Thus, a lookup table may be used to store values associated with functions such as exponentials, sines, cosines, noise, etc.

The selection of the particular lookup table or texture map used for a particular pass or operation may be determined based on the state information 18 or through information included in the sets of texture coordinates received from the raster engine 30. Although the output of the texture mapping block 40 is labeled as color data 42, the output of the texture mapping block 40 may include data intended to be reprocessed through a subsequent passes in the graphics pipeline 20. As such, the "color data" resulting from a "texture mapping" operation may not actually be color data as it is commonly understood. Thus, the output of the texture mapping block 40 may be the result of a functional lookup such as the calculation of an exponential where the exponential result is to be included in a set of texture coordinates applied to a texture map stored in the texture memory 50 in a subsequent pass.

The pixel blending block 60 is operably coupled to the texture mapping block 40 and is also coupled to receive a portion of the state information 18 and at least a portion of the buffered intermediate data 72. The pixel blending block 60 generates fragment data 62 based on the color data 42 (which preferably includes at least one lookup value), a portion of the primitive parameters 14 as passed down through the graphics pipeline 20, the state information 18 it receives, and possibly a portion of the buffered intermediate data 72. The functional operation of the pixel blending block 60 will be explained in additional detail with respect to FIG. 2 below.

The output of the pixel blending block 60 during a final pass of a multipass operation is the fragment data 62. For other passes in a multipass operation, the results produced by the pixel blending block 60 are routed to the intermediate memory 70 for temporary storage prior to use in subsequent passes. The intermediate memory 70 is operably coupled to the pixel blending block 60 and also to the texture mapping block 40. The intermediate memory 70 receives a portion of the state information 18, where the state information received controls the operation of the intermediate memory. Thus, the state information 18 can control when the intermediate memory 70 accepts data for buffering and also when the intermediate memory 70 outputs the buffered intermediate data 72 for use in subsequent processing operations. As such, the intermediate memory 70 selectively buffers and selectively outputs intermediate data.

As can be seen in FIG. 1, a first feedback path exists from the output portion of the pixel blending block 60 to an input portion of the texture mapping block 40. The first feedback path allows results of operations performed by the pixel blending block to be used in subsequent operations performed by the texture mapping block. Thus, the results of a first pass can be used to determine texture coordinates corresponding to a particular texture in a second pass. This can be useful if a complex mathematical function is used to determine the specific texture coordinates to be used for a texture map. The complex mathematical operation could be performed during a first pass using a lookup table that stores a discrete approximation of the complex mathematical function. The results can then be routed back to the texture mapping block 40 through the feedback path such that the results can be used to perform the texture mapping operation on the subsequent pass. This enables the complexity of the pixel blending block 60 to be limited to being able to perform simple blending operations that may include simple mathematical operations such as multiplication, addition and subtraction while still enabling the graphics pipeline 20 to support more complex mathematical functions.

It can also be seen that a second feedback path exists from the output portion of the pixel blending block 60 to the input portion of the pixel blending block 60. This feedback path allows results of operations performed by the graphics pipeline 20 to be used in subsequent operations performed by the pixel blending block 60. Thus, a color value determined during a first pass can be blended with color data generated from various additional texture mapping operations or lookups performed during a second pass. This further enhances the flexibility and range of operations that the graphics pipeline 20 can perform using the limited amount of circuitry provided.

By including the intermediate memory 70 in the feedback paths to the texture mapping block 40 and the pixel blending block 60, a large number of operations for a number of pixels can be performed during each pass by the graphics pipeline 20. The results from each of these pixel operations can be stored in the intermediate memory 70 such that they can be used during a subsequent pass. Thus, the size of the intermediate memory 70 can determine the number of pixel operations that can be performed during a particular pass.

In order to enable a limited-sized intermediate memory 70 to be utilized in the graphics pipeline 20, the raster engine 30 may include counters or other means for determining when the capacity of the intermediate memory 70 has been filled. The raster engine 30 can then stop processing operations for a particular set of pixel parameters received until a subsequent set of state information 18 is received corresponding to the subsequent pass. Thus, if a particular triangle is so large that the intermediate memory 70 cannot store an adequate number of intermediate results for the entire primitive, a number of separate sets of multipass operations can be performed to obtain the desired multipass results for the entire primitive. Thus, the primitive may be divided into smaller portions where each portion is processed individually. In such a multi-portion multipass operation, the first portion would be processed through the first pass using a first set of state information. The resulting intermediate data would be stored in the intermediate memory 70. A second pass would then utilize this intermediate data for the first portion of the triangle along with a second set of state information. When the number of passes required to fully process the first portion have been completed, the raster engine 30 would move on to processing a second portion using each of the various sets of state information corresponding to the multipass processing of the primitive.

The number of pixels that can be rendered by software and included in a drawing command is somewhat arbitrary, and the buffering performed by the intermediate memory 70 is limited. As such, the raster engine must prevent the intermediate memory 70 from overflowing and must notify the control processor 10 when the information for a particular multipass operation must be provided for one or more subsequent sets of multipass operations. This can be accomplished through the use of the overflow indication 16. When the control processor finishes issuing the sets of state information 18 and primitive parameters 14 for a particular multipass drawing operation, the control processor 10 checks the overflow indication 16 to determine if the raster engine 30 was successful in completing all of the multipass operations required to fully process the drawing command. If the overflow indication 16 is asserted, the control processor 10 reissues the sets of state information and. provides the appropriate primitive parameters corresponding to that drawing command. The raster engine 30 can then disregard any portions that have already been fully processed and ensure that the subsequent portions of the primitive or primitives to be processed are processed accordingly. This process will repeat until the raster engine 30 has successfully rendered all of the pixels corresponding to the particular drawing command.

When a set of multipass operations corresponding to a set of pixels has completed, the output of the pixel blending block 60 will be fragment data 62 that is provided to a render backend block 80. The fragment data 62 preferably includes information such as the pixel coordinates for the pixel to which the fragment data 62 corresponds, a Z value for the fragment (if three-dimensional images are supported), and a color value for the fragment. The render backend block 80 is operably coupled to the frame buffer 90. The frame buffer 90 stores image data corresponding to a frame. The render backend block receives the fragment data 62 from the graphics pipeline 20 and combines the fragment data with image data stored in the frame buffer 90 such that the image data stored in the frame buffer 90 is updated based on the drawing command from which the fragment data 62 was derived. The blending operations and interaction between the render backend block 80 and the frame buffer 90 is well understood in the art.

FIG. 2 provides a more detailed block diagram of a graphics pipeline 20 in accordance with a particular embodiment of the invention. The graphics pipeline 20 illustrated in FIG. 2 is shown to include the raster engine 30, the texture mapping block 40, the pixel blending block 60, and the intermediate memory 70. The texture data referenced by the texture mapping block 40 may be stored in memory included within the texture mapping block 40, or may be stored in an external texture memory 50 as was illustrated in FIG. 1. The graphics pipeline 20 illustrated in FIG. 2 is shown to receive primitive parameters 14 and state information 18 which preferably originate from a control processor such as that illustrated in FIG. 1. The intermediate memory 70 is included in the graphics pipeline 20 to allow for buffering of data in the various feedback paths included in the graphics pipeline 20.

As is illustrated, the raster engine 30 receives the primitive parameters 14 and state information 18 and is shown to generate a plurality of sets of texture coordinates 116–118. Each of these sets of texture coordinates may correspond to a different texture map, or to a lookup table that may store a discrete approximation of a complex mathematical function or some other function useful in graphics processing. The raster engine 30 also generates color values 119 and 120 from the primitive parameters 14 received, where the color values 119 and 120 may include a material color and a specular color related to lighting effects. The raster engine 30 also generates XY coordinate data 121 corresponding to the pixel for which the fragment to be generated corresponds. The Z data 122 is also generated based on the primitive parameters 14 received.

The raster engine 30 may include a pixel counter 114 that is used for generating the overflow indication 16. The pixel counter 114 can be used to determine the number of sets of resultant pixel information (intermediate data) that have been generated for a particular pass of a multipass operation. This can be used to monitor the capacity of the intermediate memory 70 such that when the pixel counter reaches a maximum capacity count, the overflow indication 16 will be asserted such that the control processor understands that the sets of state information and primitive parameters corresponding to the multipass operation will have to be re-sent for a subsequent set of multipass processing operations.

In order to improve the efficiency with which the control processor provides the primitive parameters 14 to the raster engine 30, the raster engine 30 may include a primitive counter 112. In some cases, a multipass drawing command may include a plurality of primitives. If a portion of these primitives are fully processed during a first set of multipass operations, there is no need for the control processor 10 to provide the primitive parameters 14 corresponding to these primitives to the raster engine 30 for subsequent sets of operations corresponding to the drawing command. The primitive counter 112 can thus be used to provide a more comprehensive overflow indication 16 to the control processor 10 such that the data associated with these primitives which have already been fully processed is not relayed to the raster engine during subsequent sets.

The texture mapping block 40 is shown to include a plurality of texture coordinate selection blocks 141–143. These texture coordinate selection blocks, which may be multiplexers, are controlled by a portion of the state information 18. The texture coordinate selection blocks 141–143 each select a set of texture coordinates from the texture coordinates generated by the raster engine 30 and texture coordinates that may be included in the buffered intermediate data 72. Thus, the texture coordinate selection block 141 can select a set of texture coordinates to be used for a particular texturing operation from raster engine texture coordinates 116 as generated by the raster engine 30 and from intermediate data texture coordinates included in the buffered intermediate data 72.

The texture coordinates selected by the texture coordinate selection blocks 141–143 are provided to a lookup table, which may be a texture map 144–146 to produce a lookup value. The state information 18 may control the particular textures to which the sets of texture coordinates are applied. In some texturing operations, a number of texels, or individual texture map elements, are retrieved during a single lookup operation. These texels are then filtered to produce a resultant color value that corresponds to the result of the texturing operation. Therefore, the output of the texture maps 144–146 may be provided to filters 147–149 for filtering operations. The filters 147–149 receive a plurality of intermediate lookup values resulting from the lookup operations and filter the plurality of intermediate lookup values to produce a resultant color value. The filtering operations performed by the filters may be controlled by a portion of the state information 18.

The texture coordinate selection blocks 141–143 enable the results of a prior processing passes to be used as texture coordinates for a subsequent pass in a multipass processing operation. Thus, buffered intermediate data resulting from a first pass can be routed through the texture mapping block 40 in a way such that it is used as texture coordinates for referencing a particular texture or functional lookup table. Because the texture can be selected based on state information, which can also control the filtering, if any, performed, the substantial flexibility of operations within the graphics pipeline 20 is possible.

The pixel blending block 60 is shown to include an arithmetic block 164. The arithmetic block 164 is preferably a relatively simple arithmetic block that may only be capable of performing simple mathematical operations such as multiplication, addition, and subtraction. As such, the circuitry required to implement the arithmetic block 164 is limited and therefore cost effective. The arithmetic block 164 receives a plurality of input values that it selectively combines to produce a resultant value that may either be routed to the intermediate memory 70 for storage as intermediate data, or in the case of a final pass operation, may be the fragment color 166 corresponding to a set of fragment data that is to be provided to the render backend block 80.

A selection block 162 is used to select the plurality of input values that are combined by the arithmetic block 164.

The selection block 162 is controlled by a portion of the state information 18, and may select from one or more data values provided from the buffered intermediate data 72, the outputs of the various lookup operations performed by the texture mapping block 40, and any color values 119 and 120 generated by the raster engine 30 for the particular pixel. Note that in order to ensure that the color values 119 and 120 corresponding to a particular pixel are presented to the pixel blending block 60 at the appropriate time along with the results of any texture lookup operations corresponding to that pixel, various buffers may be included between the raster engine 30 and the pixel blending block 60 for the color values 119 and 120.

Thus, the selection block 162 can select from a number of data sources to determine what is combined by the arithmetic block 164 to either generate a fragment color 166 or intermediate data that is stored for a subsequent combination operation by the arithmetic block 164. The combination of the flexibility of the pixel blending block 60, the flexibility of the texture mapping block 40, and the feedback paths provided in the graphics pipeline 20 ensures that a large variety of pixel processing operations that are fully configurable can be performed. This is advantageous over prior art solutions in which a limited set of functions could be performed in the graphics pipeline based on a limited instruction set. By varying the state information 18 in the graphics pipeline 20, the data can be routed through the various paths and various textures, functions, and combination operations can be selected to perform a much broader range of graphics processing operations.

FIG. 3 illustrates a flow diagram of a method for multipass pixel processing. The method begins at step 202 where a command stream is received that includes a plurality of drawing commands. At least a portion of the plurality of drawing commands included in the command stream are multipass drawing commands that include a plurality of sets of state information and at least one graphics primitive. Some drawing commands may include a number of graphics primitives all of which may relate to a particular object that is to be rendered on the display.

For a multipass processing operation, the method proceeds to step 204 where a first portion of a graphics pipeline is configured using a first set of state information of the plurality of sets of state information received for the multipass drawing commands. The graphics pipeline preferably includes a raster engine, a texture mapping block, and an arithmetic block as was illustrated in FIGS. 1 and 2. The configuration performed at step 204 can perform such functions as selecting texture maps or functional lookup tables to be used by the texture mapping block, selecting the particular sets of input data to be combined by the arithmetic block, and determining data routing within the system such that the results of the first pass through the graphics pipeline will be buffered for use in a subsequent pass.

At step 206, at least a portion of one of the primitives included in the multipass drawing command is processed using the graphics pipeline as configured by the first set of state information to produce resultant data. Processing of the portion of the primitives preferably includes converting the graphics primitives to a plurality of pixels. Each pixel of the plurality of pixels is characterized by a plurality of pixel parameters that may include pixel coordinates, a Z value, one or more color values, and texture coordinate data. The texture coordinate data included in the plurality of pixel parameters can be used in the processing operations to determine at least one lookup table value. The lookup table value determined may correspond to determining a particular color for the pixel based on one or more texture maps. This may include fetching a number of texels through a number of texture memory accesses, where the texels are then filtered to produce a texture map color value. In other cases, the lookup table value may correspond to a functional result that is determined based on providing the texture map coordinates to a lookup table that stores data corresponding to a particular function. Thus, the lookup tables can be used to approximate complex mathematical functions or other useful functions.

At step 208, at least a portion of the resultant data produced through the processing operations at step 206 is stored as intermediate data. The intermediate data may be stored in an intermediate data memory, or buffer, which is of a limited size. As such, a multipass drawing command may have to be separated into a number of processing portions based on intermediate data storage capabilities of the intermediate data memory. Therefore, multiple sets of multipass operations may be performed for a particular drawing command.

At step 210, the graphics pipeline is configured using a second set of state information of the plurality of sets of state information received for the particular multipass drawing command. The configuration performed at step 210 may differ significantly from the configuration at step 204. Different lookup tables, or texture maps may be selected, data may be routed in different ways, and different arithmetic operations may be selected.

At step 212, the portion of the at least one graphics primitive processed during the first pass at step 206 is processed again using the graphics pipeline as configured by the second set of state information. The second set of state information may configure the graphics pipeline such that a portion of the intermediate data is utilized during the processing performed at step 212. Thus, a result produced during the first pass may be used as input to the second pass.

Subsequent passes can then be performed by reconfiguring the graphics pipeline using subsequent sets of state information and continuing to route the data through the graphics pipeline. Each set of state information can configure the graphics pipeline in a different manner to achieve the required results.

It should be noted that multiple passes may be performed to fill the intermediate memory with a plurality of sets of resultant data that may be combined through a subsequent processing operation. For example, a first pass could produce intermediate data A which is stored in the intermediate memory. A second pass could produce intermediate data B which is also stored in the intermediate memory, wherein the data B is generated independent of the intermediate data A. A third pass could then produce final data C that utilizes intermediate data A and intermediate data B. As such, the intermediate memory may have to be partitioned to store a number of sets of intermediate data values.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises" "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for multipass pixel processing, comprising:

receiving a command stream that includes a plurality of drawing commands, wherein each of the plurality of drawing commands includes a plurality of sets of state information and at least one graphics primitive;

configuring a first portion of a graphics pipeline using a first set of state information of the plurality of sets of state information;

processing at least a first portion of the at least one graphics primitive using the graphics pipeline as configured by the first set of state information, wherein processing produces resultant data;

storing at least a portion of the resultant data as intermediate data;

configuring at least a second portion of the graphics pipeline using a subsequent set of state information of the plurality of sets of state information; and processing the at least a portion of the at least one graphics primitive using the graphics pipeline as configured by the subsequent set of state information, wherein processing includes utilization of the intermediate data.

2. The method of claim 1, wherein the graphics pipeline includes a raster engine, a texture mapping block, and an arithmetic block such that configuring a portion of the graphics pipeline includes configuring at least one of the raster engine, the texture mapping block, and the arithmetic block.

3. The method of claim 2, wherein processing includes:

converting graphics primitives to a plurality of pixels, wherein each pixel of the plurality of pixels is characterized by a plurality of pixel parameters; and determining at least one lookup table value using a portion of the plurality of pixel parameters.

4. The method of claim 3, wherein determining a lookup table value further comprises determining a texture map color value based on a texture map stored in memory.

5. The method of claim 4, wherein determining a texture map color value further comprises performing multiple texture memory accesses and filtering multiple texels resulting from the multiple texture memory accesses to produce the texture map color value.

6. The method of claim 3, wherein determining a lookup table value further comprises determining a functional result based on a function lookup table stored in memory.

7. The method of claim 1, wherein receiving the command stream further comprises, for each drawing command received, separating the at least one graphics primitive for the drawing command into processing portions based on intermediate data storage capabilities.

8. The method of claim 1, wherein the pixel parameters include at least one of color information, pixel coordinates, Z information, and texel coordinates.

9. The method of claim 1, wherein each set of state information is used to configure portions of the graphics pipeline to control pipeline functions that include at least one of data routing, arithmetic operations, and addressing data stored in memory.

10. The method of claim 1, wherein each set of state information configures data routing in the graphics pipeline to control the utilization of the intermediate data.

11. A video graphics circuit, comprising:

a graphics pipeline coupled to receive state information and primitive parameters wherein the pixel processing pipe includes:

a raster engine operably coupled to receive a first portion of the state information and the primitive parameters, wherein the raster engine produces pixel information from the primitive parameters based on the first portion of the state information;

a texture mapping block operably coupled to the raster engine, wherein the texture mapping block maps receives the pixel information, a second portion of the state information, and a first portion of buffered intermediate data, wherein the texture mapping block generates at least one lookup value based on the pixel information, the second portion of the state information, and the first portion of the buffered intermediate data;

a pixel blending block operably coupled to the texture mapping block, wherein the pixel blending block receives the at least one lookup value, a first portion of the primitive parameters, a third portion of the state information, and a second portion of the buffered intermediate data, wherein the pixel blending block generates fragment data based on the at least one lookup value, a first portion of the primitive parameters, a third portion of the state information, and a second portion of the buffered intermediate data; and an intermediate memory operably coupled to the pixel blending block and the texture mapping block, wherein the intermediate memory receives a fourth portion of the state information, wherein the intermediate memory selectively buffers the fragment data produced by the pixel blending block and selectively outputs the intermediate data to produce the buffered intermediate data, wherein the intermediate memory is controlled by the fourth portion of the state information.

12. The video graphics circuit of claim 11 further comprises a texture memory operably coupled to the texture mapping block of the graphics pipeline, wherein the texture memory stores at least one lookup table, wherein the at least one lookup table stores lookup values.

13. The video graphics circuit of claim 12, wherein the texture memory stores a plurality of lookup tables that includes texture maps and function lookup tables.

14. The video graphics circuit of claim 11, wherein the pixel blending block includes an arithmetic block that selectively combines a plurality of input values to produce a resultant value, wherein the plurality of input values are selected from the at least one lookup value, the first portion of primitive parameters, and the second portion of the buffered intermediate data based on the third portion of the state information, wherein the resultant value is included in the fragment data.

15. The video graphics circuit of claim 11, wherein the texture mapping block further comprises:

a texture coordinate selection block controlled by the second portion of the state information, wherein the texture coordinate selection block selects texture coordinates from raster engine texture coordinates included in the primitive parameters and intermediate data texture coordinates included in the first portion of the buffered intermediate data, wherein the texture coordinates are provided to a lookup table to produce a lookup value.

16. The video graphics circuit of claim 15, wherein the texture mapping block further comprises a filter operably coupled to the lookup table, wherein the lookup table produces a plurality of intermediate lookup values in response to the texture coordinates, wherein the filter receives the plurality of intermediate lookup values and filters the plurality of intermediate lookup values based on the second portion of the state information to produce the lookup value.

17. The video graphics circuit of claim 11 further comprises:
   a frame buffer that stores image data corresponding to a frame; and
   a render backend block operably coupled to the frame buffer and the graphics pipeline, wherein the render backend block blends fragment data received form the graphics pipeline with image data stored in the frame buffer.

18. The video graphics circuit of claim 11 further comprises a control processor operably coupled to the graphics pipeline, wherein the control processor generates the state information and the primitive parameters provided to the graphics pipeline based on a command stream, wherein the control processor configures successive sets of state information and primitive parameters provided to the graphics pipeline such that the graphics pipeline performs multipass processing operations.

19. The video graphics circuit of claim 18, wherein the control processor receives an overflow indication from the raster engine indicating that a maximum number of sets of primitive parameters have been processed for a particular set of state information such that a subsequent set of state information is provided to the graphics pipeline.

20. The video graphics circuit of claim 19, wherein the raster engine of the graphics pipeline further comprises a pixel counter, wherein the overflow indication is generated based on the pixel counter.

21. The video graphics circuit of claim 20, wherein the raster engine of the graphics pipeline further comprises a primitive counter, wherein the raster engine indicates a value stored in the primitive counter to the control processor along with the overflow indication, wherein the control processor determines the primitive parameters provided to the graphics pipeline with the subsequent set of state information based on the primitive counter.

22. A graphics processing circuit, comprising:
   a raster engine that receives primitive parameters and produces pixel information from the primitive parameters;
   a texture mapping block operably coupled to the raster engine, wherein the texture mapping block produces texture pixel information from the primitive parameters received;
   a pixel blending block operably coupled to the texture mapping block, wherein the pixel blending block generates pixel fragments from the texture pixel information received; and
   a first feedback path from an output portion of the pixel blending block to an input portion of the texture mapping block, wherein the first feedback path allows results of operations performed by the pixel blending block to be used in subsequent operations performed by the texture mapping block.

23. The graphics processing circuit of claim 22 further comprises a second feedback path from the output portion of the pixel blending block to an input portion of the pixel blending block, wherein the second feedback path allows results of the operations performed by the pixel blending block to be used in subsequent operations performed by the pixel blending block.

24. The graphics processing circuit of claim 23, wherein the first and second feedback paths include buffering such that a plurality of pixels can be processed during each of a plurality of passes in a multipass operation, wherein each pass has associated state information that is used to configure the graphics processing circuit.

* * * * *